(12) United States Patent
Grossman

(10) Patent No.: US 6,358,618 B1
(45) Date of Patent: Mar. 19, 2002

(54) PROTECTIVE COATING ON METAL

(75) Inventor: David G. Grossman, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/401,176

(22) Filed: Sep. 22, 1999

(51) Int. Cl.⁷ .............................................. B32B 15/04
(52) U.S. Cl. .................... 428/472; 428/469; 428/701; 428/702; 428/471
(58) Field of Search ................. 428/632, 633, 428/469, 472, 701, 702

(56) References Cited

U.S. PATENT DOCUMENTS

| | | | |
|---|---|---|---|
| 3,368,712 A | 2/1968 | Sanford et al. | 220/64 |
| 3,397,076 A | 8/1968 | Little et al. | 117/70 |
| 3,597,241 A | 8/1971 | Perugini et al. | 106/1 |
| 3,704,333 A | 11/1972 | Spangler et al. | 260/683 |
| 3,708,317 A * | 1/1973 | Owen et al. | 106/56 |
| 3,719,519 A | 3/1973 | Perugini | 117/71 |
| 3,936,287 A | 2/1976 | Beall et al. | 65/30 |
| 4,099,990 A | 7/1978 | Brown et al. | 148/6.35 |
| 4,410,418 A | 10/1983 | Kukes et al. | 208/48 |
| 4,444,732 A | 4/1984 | Konoki et al. | 422/241 |
| 4,592,598 A | 6/1986 | Mosser et al. | 428/432 |
| 4,724,064 A | 2/1988 | Reid | 208/48 |
| 4,997,698 A | 3/1991 | Oboodi et al. | 428/209 |
| 5,071,801 A * | 12/1991 | Bedard et al. | 501/128 |
| 5,208,069 A | 5/1993 | Clark et al. | 427/226 |
| 5,242,574 A | 9/1993 | Broutin et al. | 208/48 |
| 5,250,360 A | 10/1993 | Andrus et al. | 428/471 |
| 5,269,137 A | 12/1993 | Edwards, III | 60/261 |
| 5,298,332 A | 3/1994 | Andrus et al. | 428/469 |
| 5,399,257 A | 3/1995 | Russ et al. | 208/48 |
| 5,453,290 A * | 9/1995 | Van Der Zel | 427/2.27 |
| 5,618,763 A * | 4/1997 | Frank et al. | 501/5 |
| 5,807,616 A | 9/1998 | Trotter, Jr. | 428/34.4 |

FOREIGN PATENT DOCUMENTS

| | | | |
|---|---|---|---|
| EP | 0 092 959 A2 | 11/1983 | C23C/1/00 |
| EP | 0 540 084 A1 | 5/1993 | B01J/19/00 |
| EP | 0 608 081 A1 | 7/1994 | C23C/16/40 |
| GB | 1199483 | 7/1970 | B44D/1/34 |
| GB | 2066696 | 7/1981 | B01J/19/02 |
| GB | 1604604 | 12/1981 | C09D/5/08 |

OTHER PUBLICATIONS

J. Barnes, J. Corish & J.F. Norton, Sulfur Effects on the Internal Carburizaiton of Fe–Ni–Cr Alloys, Oxidation of Metals, vol. 26, No. 5/6, 1986, pp. 333–349.

* cited by examiner

Primary Examiner—Deborah Jones
Assistant Examiner—Jennifer McNeil
(74) Attorney, Agent, or Firm—Milton M. Peterson; Timothy M. Schaeberle

(57) ABSTRACT

A component of a thermal processing apparatus for a fluid stream of hydrocarbons, a precursor glass for a glass-ceramic coating on such component, and a method of inhibiting deposition of a material, such as carbon, on a surface of the component.

13 Claims, 1 Drawing Sheet

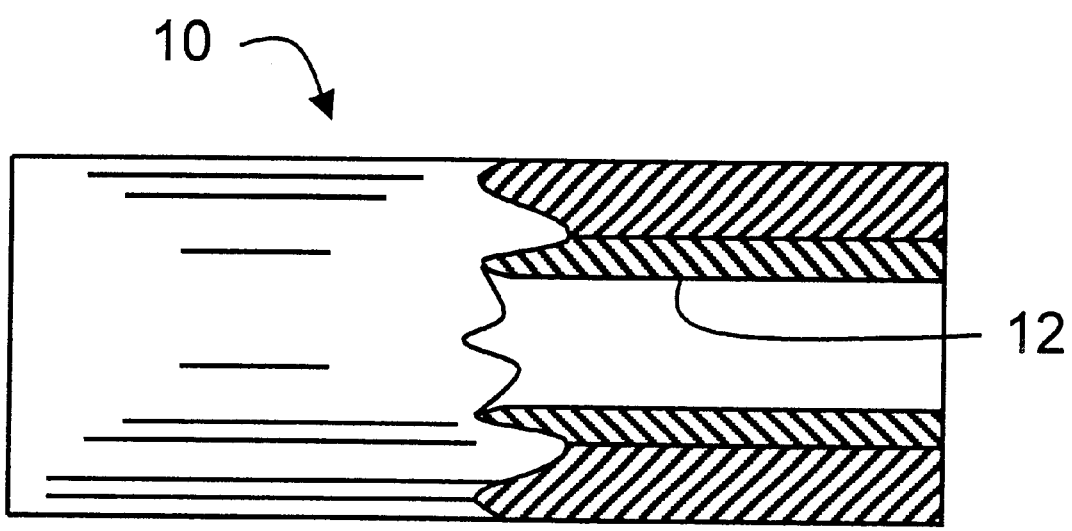

PROTECTIVE COATING ON METAL

FIELD OF THE INVENTION

A metal article protected against carbon deposits, a thermal cracking furnace embodying such article, and a method of protecting the metal article.

BACKGROUND OF THE INVENTION

The protection of metals, particularly alloys, from exposure to carbon at elevated temperatures is encountered in many industrial environments. Two problems commonly encountered are carburization of the metal and carbon buildup on the metal. Both problems are of particular concern in a furnace employed in thermal cracking a stream of hydrocarbons to produce olefins. Therefore, the invention is described with reference to this operation.

At the heart of a thermal cracking process is the pyrolysis furnace. This furnace comprises a fire box through which runs a serpentine array of tubing. This array is composed of lengths of tubing and fittings that may total several hundred meters in length. The array of tubing is heated to a carefully monitored temperature by the fire box.

A stream of feedstock is forced through the heated tubing under pressure and at a high velocity, and the product is quenched as it exits. For olefin production, the feedstock is frequently diluted with steam. The mixture is passed through the tubing array which is commonly operated at a temperature of at least 750° C. During this passage, a carboniferous residue is formed and deposits on the tube walls and fittings.

The carbon deposits initially in a fibrous form. It is thought this results from a catalytic action, primarily due to nickel and iron in the tube alloy. The fibrous carbon appears to form a mat on the tube wall. This traps pyrolytic coke particles that form in the gas stream. The result is buildup of a dense, coke deposit on the tube wall. This carbon buildup is commonly referred to as "coking."

A short range concern is the thermal insulating effect of the carbon buildup on the tube wall. This necessitates continually increasing the fire box temperature to maintain a steady temperature in the hydrocarbon stream passing through the furnace. Ultimately, the fire box and the tube wall reach temperatures where operation must be discontinued. The carbon must then be removed in a procedure referred to as decoking.

A longer range concern is the effect of the carbon on the metal tubes in the cracking furnace. A gradual embrittlement of the metal is observed with consequent loss of mechanical strength. Since the operation is conducted under considerable pressure and tensile load, the danger of tube rupture arises. Both pressure and tensile load tend to be relatively constant factors. However, as a metal tube becomes weak due to embrittlement, these factors become significant. It then becomes necessary to shut the operation down and completely rebuild the furnace with new tubing.

It has been proposed to apply a glass-ceramic coating to a metal surface to protect the metal from embrittlement due to carburization. It has also been proposed to employ a glass-ceramic coating to lessen the tendency for carbon deposition (coking) to occur during a thermal cracking process.

TABLE I sets forth, in weight percent on an oxide basis as calculated from the precursor glass batch, the compositions for several, different glass-ceramics proposed as protective coatings. Examples 1–6 illustrate alkaline earth metal alumino borates or borosilicates. Examples 7–14 illustrate alkaline earth metal silicates which may contain minor amounts of alumina or zirconia.

TABLE I

| | $SiO_2$ | $B_2O_3$ | $Al_2O_3$ | BaO | MgO | CaO | ZnO | $ZrO_2$ | $MnO_2$ | SrO | NiO | F |
|---|---|---|---|---|---|---|---|---|---|---|---|---|
| 1 | — | 19.1 | 27.9 | 42.0 | 11.0 | — | — | — | — | — | — | — |
| 2 | — | 25.4 | 18.6 | 56.0 | — | — | — | — | — | — | — | 6 |
| 3 | 17.5 | 20.2 | 29.7 | — | — | 32.6 | — | — | — | — | — | — |
| 4 | 9.6 | 22.2 | 32.5 | — | — | 35.8 | — | — | — | — | — | — |
| 5 | 30.6 | 12.7 | 3.8 | 15.9 | 23.5 | — | 13.5 | — | — | — | — | — |
| 6 | — | 27.0 | 1.8 | 29.7 | 7.8 | — | 15.8 | — | — | — | — | — |
| 7 | 32.0 | — | — | 40.9 | — | — | — | 8.2 | 18.9 | — | — | — |
| 8 | 33.9 | — | 2.9 | 43.3 | — | — | — | — | 20.0 | — | — | — |
| 9 | 33.2 | 4.8 | — | 42.4 | — | — | — | — | 19.6 | — | — | — |
| 10 | 65.0 | — | 6.9 | — | — | — | — | — | — | 28.1 | — | — |
| 11 | 47.2 | — | — | — | — | — | — | 12.1 | — | 40.7 | — | — |
| 12 | 54.1 | — | 5.7 | — | — | — | — | — | — | 23.3 | 16.8 | — |
| 13 | 38.3 | — | — | — | — | — | — | 5.9 | 22.7 | 33.1 | — | — |
| 14 | 62.7 | — | 5.3 | 32.0 | — | — | — | — | — | — | — | — |

The efficacy of a glass-ceramic coating for these respective purposes was tested on a section of tubing in a thermal cracking furnace. A tendency for sections of the coating to separate from the metal was observed. This undesirable occurrence was thought to be occasioned by an expansion mismatch between the metal and the glass-ceramic coating. The metal was an authentic metal having a CTE of about $180 \times 10^{-7}/°$ C. (RT-800° C.), whereas the glass-ceramic had a CTE of about $130 \times 10^{-7}/°$ C.

It was recognized that this disparity in CTEs created high compressive stresses in the coating. In accordance with standard enameling experience, this would normally be considered desirable. However, the conditions that prevail during operation of a thermal cracking furnace are rather severe. In particular, the furnace undergoes rapid thermal change during a decoking cycle.

It is a purpose of the present invention to provide a solution to the problem created by a glass-ceramic separating from a metal on which it is coated. Another purpose is to provide an adherent, glass-ceramic coating on a metal body having a high CTE. A further purpose is to provide a component for a thermal cracking furnace that has a glass-ceramic coating with a high CTE. Another purpose is to provide an improved method of protecting a metal body with a glass-ceramic coating.

SUMMARY OF THE INVENTION

One aspect of the present invention resides in a metal article having a coating on at least a portion of its surface that protects the metal from contact with carbon, the coating comprising a glass-ceramic having a predominant crystal phase of leucite.

A further aspect of the invention resides in a thermal processing apparatus for a fluid stream of hydrocarbons, the apparatus comprising a metal component having a surface potentially exposed to carbon depositing on that surface, the component surface having a thin, adherent layer of a glass-ceramic covering the surface to inhibit the carbon from depositing, the glass-ceramic having leucite as its predominant crystal phase.

Another aspect of the invention relates to an improved method of protecting a metal surface from deposition of carbon on that surface by applying a layer of glass-ceramic over the metal surface, the glass-ceramic layer having leucite as its predominant crystal phase.

BRIEF DESCRIPTION OF THE DRAWINGS

The single FIGURE in the accompanying drawing is a side view of a tubular, metal body 10 with a section removed to show an internal coating 12 in accordance with the present invention.

DESCRIPTION OF THE INVENTION

As noted earlier, it has been proposed to use a glass-ceramic coating to isolate a metal surface from contact with carbon. Bench testing indicated that this approach could alleviate both the occurrence of metal embrittlement and that of carbon buildup. However, actual testing, under operating conditions in a thermal cracking furnace, revealed a problem with adherence of the coating to the metal.

Sections of the coating tended to separate from the wall of the furnace tube at some point in the operation. This, of course, left the tube wall exposed and nullified any positive effect of the coating. It was theorized that this undesirable occurrence might be occasioned by the expansion mismatch between the tube metal and the glass-ceramic coating.

The present invention arose from experiments designed to first determine the cause of the coating non-adherence, and second, to test a possible remedy. X-ray diffraction studies, made on test pieces, indicated stress values as high as 60,000 psi could develop in a coating under operating conditions.

The combination of a high coefficient of thermal expansion (CTE), ability to withstand high temperatures, and good chemical durability is not readily available in a single glass or glass-ceramic. One area in which such a combination has been sought is the field of dental materials. There, attention has focused on leucite ($K_2O$-$Al_2O_3$-$4SiO_2$) compositions to produce dental porcelains.

In compounding dental porcelains, natural feldspars are used as the primary source of leucite crystals. The CTE of a potash feldspar, melted at a temperature above 1530° C. and cooled to a glass without crystallization, is about $84 \times 10^{-7}$/° C. If, instead, the feldspar is heated to a temperature in the range of 1150–1300° C., it melts incongruently. When the melt is cooled in an ordinary manner, a glass embedded with leucite particles is obtained. This provides CTEs on the order of $140$–$150 \times 10^{-7}$/° C.

For present purposes, an initial effort was made to incorporate leucite crystals in a glass as a filler or mill addition. The intent was to utilize the crystals to increase the CTE of the combination to a value higher than that of the glass. One glass employed was the barium borosilicate, precursor glass for a previously used glass-ceramic coating. The leucite crystals reacted with this glass to produce additional glass at the expense of crystallinity.

This unexpected result led to a search for a more compatible glass. A dental porcelain composition, based on leucite, was selected as a potential matrix glass. Also, an all-potash melt was attempted. Both of these melts were too viscous to pour even at a temperature of 1650° C.

Accordingly, a different approach was adopted in developing coating materials for present purposes. A $K_2O$-$Al_2O_3$-$SiO_2$ composition, close to the equilibrium phase field for leucite, but somewhat lower in alumina, was selected as a base composition. In an effort to produce a glass that could be worked at a temperature not over 1600° C., glass batches embodying a variety of fluxes were formulated. These included, individually and in combinations, compounds of the alkaline earth metals Ca, Mg, Ba and Sr, sodium, boron and titanium.

The formulated, glass batches were mixed, using oxides and carbonates as raw materials, and melted. The melts were rapidly quenched by pouring into water (dri-gaging). The glass particles, thus produced, were ball milled with alumina media to produce glass powders having an average size of about 8 microns. The powders were pressed into bars, and the bars sintered, to provide test pieces for determining coefficients of thermal expansion.

It was most surprising when one of the pressed bars of powdered glass exhibited a CTE of $191$–$196 \times 10^{-7}$/° C., rather than an expected value between $80$–$90 \times 10^{-7}$/° C. The high CTE value indicated that at least some crystallization was occurring in spite of the absence of a nucleating agent.

The direct crystallization of leucite from amorphous, powdered frit provided a method to obtain high expansion coatings on metallic substrates. The glass powders were mixed with water and a suitable binder, and then sprayed onto the substrate. After drying, the green (unfired) coating was fired so that the glass particles melted and flowed while bonding to the substrate. Continued heating allowed for leucite crystallization so that a high thermal expansion resulted. By designing the expansion of the coating to be 85–90 percent of that of the substrate, an appropriate degree of compression resulted in the crystallized coating.

It was recognized that, to be useful, the composition of a leucite-type glass would have to be such that the glass would flow and bond to a metal surface at a temperature not over about 1200° C. This limitation was imposed to avoid damage to the metal alloys being coated.

Glasses were tested by evaluating their behavior on a metal substrate. The glass was reduced to a powder, mixed with a binder, and the mixture sprayed on the metal substrate. The substrate was a test piece cut from a furnace tube of HP-45 alloy, an austenitio, Fe—Cr—Ni metal alloy. The coated, metal substrate was then dried and heated to 1200° C. at 10° C./minute. It was held at that temperature for eighteen minutes to cause the glass particles to melt and flow. This created a continuous coating on the metal surface. The thus coated, metal test piece was cooled at 100 C./minute to 1050° C., and held at that temperature for four hours. This permitted leucite crystals to develop in a glassy matrix. The test piece was then cooled at furnace rate. Compositions have been evaluated on their ability to provide a smooth, continuous coating when fired on this schedule: 10° C./minute to 1200° C.; held eighteen minutes; 10° C./minute to 1050° C.; held four hours; cool at furnace rate.

In order to obtain glasses that would produce a smooth, continuous coating at a temperature not over 1200° C., a variety of fluxes were employed. These included alkalies, alkaline earths, $B_2O_3$ and $TiO_2$. These fluxes were substituted for $K_2O$ and/or $Al_2O_3$ in the basic leucite composition.

Soda ($Na_2O$) occurs naturally in feldspars, and $B_2O_3$ is a well known flux. Both of these oxides were added in amounts up to about 6%. Large amounts of soda tended to react with the metal. Large amounts of $B_2O_3$ tended to interfere with development of fine, leucite crystals. Accordingly, the total $Na_2O + B_2O_3$ content should not exceed 8%, each of these oxides being limited to no more than 4% by weight, and preferably no more than 2%, as fluxes.

Substitution of $Cs_2O$ for $K_2O$ lowered the expansion coefficient by reducing the total leucite crystal content. However, the glasses did not flow well. Accordingly, this oxide, in amounts up to about 2% in conjunction with other oxides, can be used to reduce the effective CTE.

Efforts were made to substitute alkaline earths, CaO and SrO, for silica and alumina. These substitutions were less effective as fluxes than were $Na_2O$ and $B_2O_3$. However, they did not interfere with development of leucite crystals. Accordingly, up to about 4 weight percent of each proved useful. Up to 4% MgO could be substituted without any problem. Efforts to employ ZnO as an additive were unsuccessful. The total content of these bivalent oxides should not exceed about 8%.

In general, then, leucite glass-ceramic, precursor glasses, for present purposes, will consist essentially of, in weight % on an oxide basis, 57–66% $SiO_2$, 10–17% $Al_2O_3$, 10–18% $K_2O$ and 3–18% flux oxides. Preferred composition consist essentially of 58–64% $SiO_2$, 11–16% $Al_2O_3$, 11–17% $K_2O$ and 5–16% flux oxides.

As already indicated, the crystallization behavior of glasses in the leucite composition family is composition dependent. Control of particle size is another way to influence crystallization. This is based on the fact that these glasses are self-nucleated, that is, a glass particle serves as the nucleus for crystal formation and growth.

The effect of particle size was rather dramatically illustrated by an unsuccessful attempt to crystallize a molded, coin-size, glass body. When it was heat treated on the same cycle as the pressed bars, it remained perfectly clear and showed no evidence of crystal formation.

Particle size effect was further studied by treating, on an identical schedule, three particle size distributions of the same glass. The three samples had average particle sizes, respectively, of 10, 20 and 30 microns. When applied as coatings and fired, the two larger size samples produced glossier, smoother coatings than the 10 micron sample. This suggested that crystal formation and growth was sufficiently delayed in the samples having larger size particles to permit better softening and flow of the glass.

TABLE II, below, sets forth, in weight percent as calculated on an oxide basis, several compositions that illustrate, but do not limit, the crystallizable glasses of the present invention. The surface appearance of a powdered glass sample applied to a metal substrate, and fired on the cycle described above, is shown. Also shown are coefficients of thermal expansion (CTEs) measured on bars produced from the powdered glass and fired on the same schedule.

TABLE II

|  | 15 | 16 | 17 | 18 | 19 | 20 | 21 | 22 |
|---|---|---|---|---|---|---|---|---|
| $SiO_2$ | 63.8 | 63.8 | 60 | 60 | 60 | 59 | 58.3 | 59 |
| $Al_2O_3$ | 16.0 | 16.0 | 15 | 15 | 13 | 13 | 11.2 | 14 |
| $B_2O_3$ | — | — | 4 | 2 | 4 | 2 | 2 | 2 |
| CaO | 3.2 | 3.2 | 2 | 2 | 2 | 1 | 2 | 2 |
| SrO | 1.0 | 1.0 | 2 | 2 | 2 | 2 | 1.9 | — |
| MgO | 1.7 | 1.7 | 1 | 1 | 1 | 4 | 1.9 | 1 |
| BaO | — | — | — | — | 1 |  |  | 4 |
| $Na_2O$ | — | 2.0 | — | 2.0 | 4 | 2 | 1.9 | 2 |
| $K_2O$ | 17.0 | 15.0 | 15 | 15 | 11 | 13 | 12.6 | 13 |
| $TiO_2$ | — | — | 1 | 1 |  | 2 | 1.9 | 1 |
| $Cs_2O$ |  |  |  |  | 2 | 2 | 1.9 | 2 |
| $La_2O_3$ |  |  |  |  |  |  | 4.4 |  |
| $Li_2O$ |  |  |  |  |  |  |  |  |
| coated metal |  |  | glossy | glossy | pock marks | semi gloss | semi gloss | glossy |
| CTE | 191 | 196 | 155 | 210 | 158 | 174 | 169 | 180 |

Table III shows corresponding compositions for three comparison glasses prepared and fired in the same manner as the samples of Table I.

TABLE III

|  | 23 | 24 | 25 |
|---|---|---|---|
| $SiO_2$ | 62.3 | 59 | 61.8 |
| $Al_2O_3$ | 16.4 | 13 | 9.0 |
| $B_2O_3$ | — | 6 | 2.1 |
| CaO | 1.5 | 1 | 2.1 |
| SrO | — | 1 | 3.2 |
| MgO | 0.8 | 1 | 2 |
| BaO |  | 1 | — |
| $Na_2O$ |  | 3 | 2 |
| $K_2O$ | 19.0 | 13 | 13.4 |
| $TiO_2$ |  |  | 2 |
| $Cs_2O$ |  | 2 | 2 |
| $La_2O_3$ |  |  |  |
| $Li_2O$ |  |  | 0.4 |
| coated metal | could not pour | wrinkled | non-wetting |
| CTE |  | 152 |  |

The glass of Example 23 was so viscous after melting at 1650° C. that it could not be poured. This is due to the absence of both $Na_2O$ and $B_2O_3$ in the composition in combination with a high $K_2O$ content. Example 24 illustrates the effect of a high $B_2O_3$ content, particularly in the presence of $Na_2O$. The coating was wrinkled and had a relatively low expansion. Example 25 illustrates the effect of substituting fluxes, particularly $Li_2O$, for alumina.

Glass batches, based on the compositions of TABLES II and III, were mixed using standard oxides and carbonates. The batches were melted in 1800 cc., silica crucibles at 1600° C. for two hours. A sample the size of a coin was poured in a mold. The remainder of the melt was dri-gaged, or rolled as ribbon and crushed, to produce particles.

The particles were converted into a fine powder of about 8–10 microns average size by ball milling for four hours with alumina media. Bars were prepared for expansion measurements by pressing the glass powder in a 10×1.2 cm (4"×½") mold. The bars were then fired on a schedule set forth above.

Slurries for spraying on metal test pieces were prepared by mixing 50 grams of glass powder with 25 cc. of deionized water, together with 0.5 ml. of a surfactant and 0.7 ml. of a dispersant. This mixture was vigorously mixed to provide a consistency for spraying.

Slurries were sprayed, using a Paasch airbrush, onto square test pieces cut from a furnace tube of HP-45 alloy that had been grit blasted. A coating thickness of about 0.125 mm (5 mils.) was targeted. The coated test pieces were fired on the same schedule as the pressed bars.

I claim:

1. A metal article that is exposed to carbon at an elevated temperature, the metal article comprising an iron alloy having an adherent coating on at least a portion of its surface, the coating comprising a glass-ceramic having leucite as its principal crystal phase.

2. A metal article in accordance with claim 1 wherein the glass-ceramic has a coefficient of thermal expansion lower than that of the metal article whereby the glass-ceramic coating is in a state of compression with respect to the metal.

3. A metal article in accordance with claim 2 wherein the coefficient of thermal expansion of the glass-ceramic is about 85–90% of that of the metal.

4. A metal article in accordance with claim 1 that is a component of a thermal processing apparatus for a fluid stream of hydrocarbons, the component having a surface normally exposed to the deposit of carbon on that surface, the surface having a thin layer of a glass-ceramic adherent to that surface to inhibit the carbon from depositing thereon, the predominant crystal phase in the glass-ceramic being leucite.

5. A metal article according to claim 4, wherein the component is an extended length of a tubular metal alloy having an interior surface to which the glass-ceramic is applied.

6. A metal article according to claim 5, wherein the metal alloy is an Fe—Ni—Cr alloy.

7. A component in accordance with claim 1 in which the glass-ceramic is thermally crystallized from a precursor glass that has a $K_2O$-$Al_2O_3$-$SiO_2$ composition additionally containing 3–18% of flux oxides.

8. A metal article according to claim 7, wherein the precursor glass is capable of being melted and poured at a temperature not over 1600° C., self-nucleates when heated in powder form, and is thermally crystallizable to a glass-ceramic containing leucite as its principal crystal phase.

9. A metal article according to claim 8, wherein the precursor glass, as calculated in weight percent on an oxide basis, consists essentially of 57–66% $SiO_2$, 10–17% $Al_2O_3$, 10–18% $K_2O$ 3–18% flux oxides.

10. A metal article according to claim 9, wherein the flux oxides are selected from $Na_2O$, $Cs_2O$, $B_2O_3$, $TiO_2$ and the alkaline earth metal oxides CaO, BaO, MgO and SrO.

11. A metal article according to claim 10, wherein the flux oxides include at least one of $B_2O_3$ and $Na_2O$, the total content of such oxides not exceeding about 8% and neither the $B_2O_3$ nor the $Na_2O$ exceeding about 4%.

12. A metal article according to claim 10, wherein the flux oxides include at least one of CaO, BaO, SrO and MgO, the total of such oxides not exceeding about 8%.

13. A metal article according to claim 9, wherein the precursor glass has a composition, as calculated in weight percent on an oxide basis, consisting essentially of 58–64% $SiO_2$, 11–16% $Al_2O_3$, 11–17% $K_2O$ and 5–16including at least one of $B_2O_3$ and/or $Na_2O$, the total of such oxides not exceeding about 4% with neither oxide exceeding about 2%, and 3–8% of at least one of BaO, MgO, CaO and SrO, with no one of these oxides exceeding about 4%.

* * * * *